United States Patent
Luo et al.

(10) Patent No.: US 12,497,589 B1
(45) Date of Patent: Dec. 16, 2025

(54) ERGOTHIONEINE-PRODUCING ENGINEERED BACTERIA AND CONSTRUCTION METHOD AND USE THEREOF

(71) Applicant: Zhejiang Seedling Biotechnology Co., Ltd, Hangzhou (CN)

(72) Inventors: Maoxing Luo, Hangzhou (CN); Tianyi Wang, Hangzhou (CN)

(73) Assignee: Zhejiang Seedling Biotechnology Co., Ltd, Hangzhou (CN)

( * ) Notice: Subject to any disclaimer, the term of this patent is extended or adjusted under 35 U.S.C. 154(b) by 0 days.

(21) Appl. No.: 19/026,516

(22) Filed: Jan. 17, 2025

(30) Foreign Application Priority Data

Sep. 6, 2024 (CN) .......................... 202411244914.2

(51) Int. Cl.
- C12N 1/20 (2006.01)
- C12P 13/00 (2006.01)
- C12Q 1/686 (2018.01)
- C12R 1/19 (2006.01)

(52) U.S. Cl.
CPC .............. *C12N 1/20* (2013.01); *C12P 13/005* (2013.01); *C12Q 1/686* (2013.01); *C12N 2500/10* (2013.01); *C12N 2500/14* (2013.01); *C12N 2500/16* (2013.01); *C12N 2500/20* (2013.01); *C12N 2500/22* (2013.01); *C12N 2500/24* (2013.01); *C12N 2500/32* (2013.01); *C12N 2500/34* (2013.01); *C12N 2500/38* (2013.01); *C12N 2500/42* (2013.01); *C12N 2500/74* (2013.01); *C12R 2001/19* (2021.05)

(58) Field of Classification Search
CPC .. C12N 1/20; C12N 2500/10; C12N 2500/14; C12N 2500/16; C12N 2500/20; C12N 2500/22; C12N 2500/32; C12N 2500/38; C12N 2500/42; C12N 2500/74; C12P 13/005; C12Q 1/686; C12R 2001/19
See application file for complete search history.

(56) References Cited

FOREIGN PATENT DOCUMENTS

| CN | 117802015 A | 4/2024 |
|---|---|---|
| CN | 118271245 A | 7/2024 |

OTHER PUBLICATIONS

Xiong et al., "Engineering Mycolicibacterium neoaurum for the production of antioxidant ergothioneine." Food Bioengineering, 1:26-36. (Year: 2022).*

* cited by examiner

*Primary Examiner* — Suzanne M Noakes
*Assistant Examiner* — Ciara A Mcknight
(74) *Attorney, Agent, or Firm* — Bayramoglu Law Offices LLC (57) ABSTRACT

Ergothioneine-producing engineered bacteria and a construction method and use thereof are provided. The construction method includes: integrating a constitutive promoter PrrnD and an ergothioneine-synthesizing gene cluster egtABCDE derived from *Mycolicibacterium neoaurum* into a genome of *Escherichia coli* as a starting strain; and further mutating glutamate at a position 271 in an ATP phosphoribosyltransferase (HisG) gene of a strain produced above into lysine to produce the ergothioneine-producing engineered bacteria. With glucose as a main raw material, a fermentation culture can be conducted with the engineered bacteria to produce ergothioneine. The fermentation with the engineered bacteria to synthesize ergothioneine has advantages such as simple process and high production efficiency, can avoid the use of organic solvents and antibiotics in large quantities, and is suitable for industrial production.

1 Claim, 3 Drawing Sheets

Specification includes a Sequence Listing.

ND CONSTRUCTION METHOD AND USE
THEREOF

ERGOTHIONEINE-PRODUCING ENGINEERED BACTERIA AND CONSTRUCTION METHOD AND USE THEREOF

CROSS REFERENCE TO THE RELATED APPLICATIONS

This application is based upon and claims priority to Chinese Patent Application No. 202411244914.2, filed on Sep. 6, 2024, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBHZQS-YYN013-PKGG_Sequence-_Listing.xml, created on Jan. 10, 2025, and is 23,155 bytes in size.

TECHNICAL FIELD

The present disclosure belongs to the field of synthetic biology, and specifically relates to ergothioneine-producing engineered bacteria and a construction method and use thereof.

BACKGROUND

Ergothioneine is a thiol compound chemically known as 2-thioimidazole amino acid. The L-isomer of ergothioneine has excellent physiological activity. Ergothioneine has the following two isomeric forms: thiol and thione. Ergothioneine exists mainly in the form of thione in aqueous solutions. Ergothioneine was originally isolated from the ergot fungus in rye of the grass family. Microorganisms such as mycobacteria, methylobacteria, cyanobacteria, and mushrooms all can naturally synthesize ergothioneine. It has been proved that ergothioneine is present in almost all human cells and tissues and is usually at a millimolar level in the brain, bone marrow, lenses and corneas of eyes, and red blood cells. However, the human body itself cannot synthesize ergothioneine, and ergothioneine can only be ingested and supplemented from food.

Ergothioneine plays an important role in human cells and tissues, which is mainly reflected in the following aspects: (1) Ergothioneine has superior oxidation resistance and stability. Thus, ergothioneine can clear the reactive oxygen species in cells, resist the oxidative damage, and maintain the redox homeostasis. (2) Ergothioneine has the potential to prevent and treat diseases such as cancer, cardiovascular diseases, and cognitive dysfunction caused by oxidative stress. (3) Ergothioneine also has the effects of improving sleep disorders and intestinal health and resisting ultraviolet damage and photoaging.

The current production methods for ergothioneine mainly include mushroom extraction, chemical synthesis, and biological synthesis. For example, CN 118271245 A discloses a method for extracting ergothioneine from *Pleurotus citrinopileatus*. The method includes: *Pleurotus citrinopileatus* is first subjected to liquid culture, and then mycelia are collected and subjected to physical ultrasonic shearing and water extraction to produce an ergothioneine-containing active composition. However, in addition to ergothioneine, the active composition includes proteins, polypeptides, polysaccharides, etc. CN 118271245 A discloses a method for chemical synthesis of ergothioneine with dimethylhistidine as a raw material. A product prepared by this method has a high chiral purity. However, the synthesis process requires organic solvents such as toluene, chloroform, carbon tetrabromide, tetrahydrofuran, and acetonitrile. CN 117802015 A discloses a method for producing ergothioneine through fermentation with genetically engineered bacteria. The method includes the following: the genetically engineered bacteria are cultured in a medium for a specified period of time, and then the induction is conducted with isopropyl β-D-thiogalactopyranoside (IPTG) to produce ergothioneine. A yield of the fed-batch fermentation can reach 4,063.15 mg/L.

With the deepening of efficacy research, ergothioneine has been widely used in fields such as cosmetics and functional foods, and the market demand for ergothioneine has also been increasing. The fermentation of engineered bacteria to synthesize ergothioneine has advantages such as a simple process and high production efficiency and can avoid the use of organic solvents in large quantities. Thus, the fermentation of engineered bacteria to synthesize ergothioneine is expected to become the mainstream method for producing ergothioneine. However, the current processes have a relatively low ergothioneine yield level, which poses a challenge to industrial production. Therefore, it is of great significance to improve the ability of engineered bacteria to synthesize ergothioneine and make the engineered bacteria suitable for industrial production.

SUMMARY

In order to solve the problems in the prior art, the present disclosure provides ergothioneine-producing engineered bacteria and a construction method and use thereof.

The present disclosure adopts the following technical solutions:

In a first aspect, the present disclosure provides a construction method of ergothioneine-producing engineered bacteria, including:

1) integrating a constitutive promoter PrrnD and an ergothioneine-synthesizing gene cluster MnegtABCDE derived from *Mycolicibacterium neoaurum* into a genome of *Escherichia coli* as a starting strain; and
2) mutating glutamate at a position 271 in an ATP phosphoribosyltransferase HisG of a strain produced in the step 1) into lysine to produce the ergothioneine-producing engineered bacteria.

The step 1) is as follows: subjecting the ergothioneine-synthesizing gene cluster MnegtABCDE derived from the *Mycolicibacterium neoaurum* to codon optimization for the *Escherichia coli* to produce an optimized sequence, adding the constitutive promoter PrrnD preceding the optimized sequence to produce a MnegtABCDE gene cluster fragment carrying the constitutive promoter PrrnD, and integrating the MnegtABCDE gene cluster fragment to a motA locus in the genome of the *Escherichia coli* BL21 (DE3).

According to a preferred solution of the present disclosure, the MnegtABCDE gene sequence produced after the codon optimization for the *Escherichia coli* is shown in SEQ ID NO: 1, and a sequence of the constitutive promoter PrrnD is shown in SEQ ID NO: 2.

In a second aspect, the present disclosure provides ergothioneine-producing engineered bacteria constructed by the construction method.

In a third aspect, the present disclosure provides a method for biological synthesis of ergothioneine, including: with glucose as a main raw material, conducting a fermentation culture with the engineered bacteria to produce the ergothioneine.

Compared with the prior art, the present disclosure adopts *Escherichia coli* BL21 (DE3) as a host cell. In the present disclosure, a constitutive promoter PrrnD and an ergothioneine-synthesizing gene cluster MnegtABCDE (undergoing codon optimization for *Escherichia coli*) derived from *Mycolicibacterium neoaurum* are integrated to a motA locus of a genome of the *Escherichia coli* by a gene editing technology, such that the host cell has the ability to synthesize ergothioneine from glucose. The constitutive promoter PrrnD adopted in the present disclosure is a promoter of ribosomal RNA of *Escherichia coli*, which has a high expression intensity and is conducive to the heterologous expression of the ergothioneine-synthesizing gene cluster. The gene cluster-integrating locus motA adopted by the present disclosure is a flagellum gene (non-essential gene) of *Escherichia coli*. The destruction of this gene will not affect the growth and metabolism of the strain, and can also reduce the consumption of non-essential energy. Further, glutamate at a position 271 in ATP phosphoribosyltransferase HisG in the host cell is mutated into lysine through a target gene site-directed mutation, which releases the feedback inhibition on L-histidine and increases the accumulation of the precursor L-histidine to greatly improve the fermentation yield of ergothioneine.

The ergothioneine-producing engineered bacteria provided by the present disclosure have excellent genetic stability. In a fermentation process of the ergothioneine-producing engineered bacteria, there is no need to add an antibiotic and an inducer, which reduces the material cost and also well guarantees the application safety of finished products in cosmetics and food. The ergothioneine-producing engineered bacteria of the present disclosure have significant advantages over the published ergothioneine-producing engineered strains.

A finished product of ergothioneine prepared through the fermentation with the ergothioneine-producing engineered bacteria provided by the present disclosure exhibits excellent properties, has an ergothioneine content of 99% or more, and can be used for large-scale industrial production and practical applications.

DETAILED DESCRIPTION OF THE EMBODIMENTS

Figure 1:
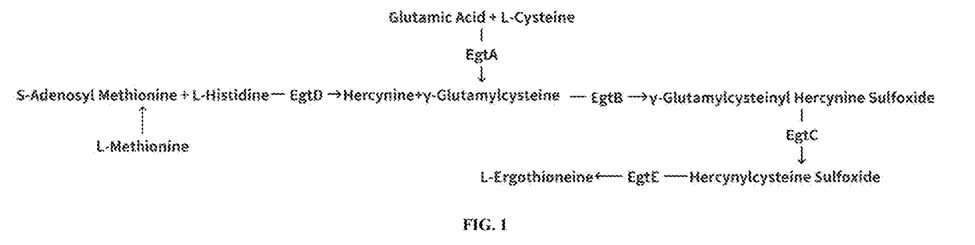
FIG. 1 shows a synthesis route of ergothioneine by engineered bacteria.
Figure 2:
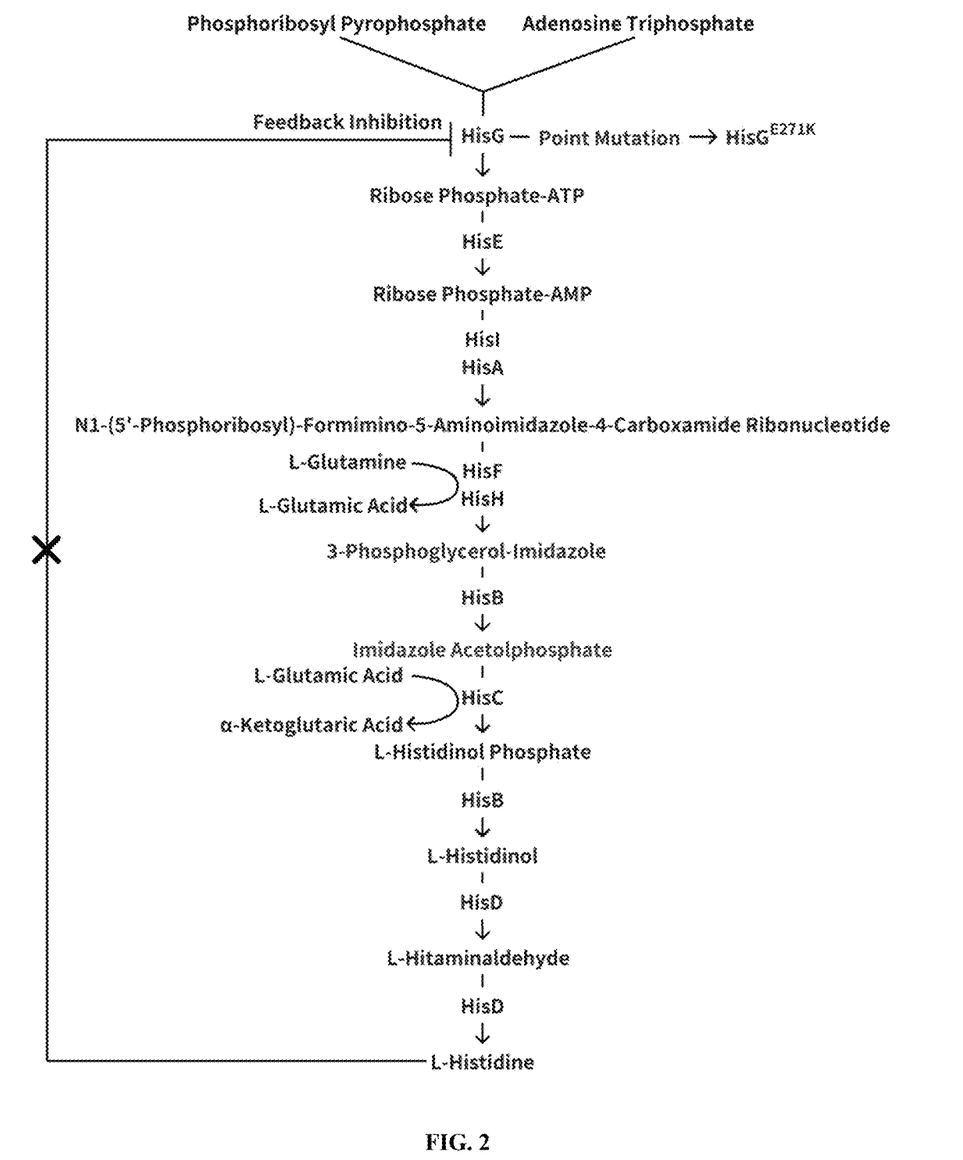
FIG. 2 is a schematic diagram of modification of HisG to release the feedback inhibition on L-histidine.

A general idea of the construction of the ergothioneine-producing engineered bacteria of the present disclosure is as follows: A constitutive promoter PrrnD and an ergothioneine-synthesizing gene cluster MnegtABCDE (undergoing codon optimization for *Escherichia coli*) derived from *Mycolicibacterium neoaurum* are integrated to a motA locus of a genome of *Escherichia coli* BL21 (DE3) as a starting strain to produce a recombinant strain BL21(DE3)ΔmotA:: MnegtABCDE, which is denoted as an engineered strain EGT01. The above process is intended to construct an ergothioneine synthesis route (as shown in FIG. 1). Further, glutamate at a position 271 in ATP phosphoribosyltransferase HisG in the EGT01 as a host cell is mutated into lysine through a target gene site-directed mutation for releasing the feedback inhibition on L-histidine (as shown in FIG. 2) to produce a recombinant strain EGT01 his (2-IK which is denoted an engineered strain EGT02.

The present disclosure is described in further detail below with reference to specific implementations. The embodiments are merely demonstrations of the contents of the present disclosure and do not limit the scope of the present disclosure.

The embodiments involve various general reaction systems and conditions. The reaction systems and conditions are described as follows:

PCR system (DNA fragment, whole-plasmid amplification): 5×PrimeSTAR buffer: 10 μL, dNTP: 4 μL, upstream and downstream primers: each 1 μL, a DNA template (genomic or plasmid DNA carrying a target gene): 0.5 μL, high-fidelity hot-start PCR DNA polymerase (HS PrimeStar® DNA polymerase): 0.5 μL, and ddH$_2$O: making up to the total volume of 50 μL.

PCR conditions (DNA fragment, whole-plasmid amplification): pre-denaturation at 95° C. for 5 min; denaturation at 95° C. for 30 s; annealing at 55° C. for 30 s; extension at 72° C. (an extension time is calculated according to 1 kb/min), 32 cycles; extension at 72° C. for 10 min; and storage at 4° C.

PCR system (colony PCR verification): 2×Rapid Taq Master Mix: 10 μL, upstream and downstream primers: each 0.4 μL, ddH$_2$O: 9.2 μL, and DNA template: appropriate amount, with a total volume of 20 μL.

PCR conditions (colony PCR verification): pre-denaturation at 95° C. for 10 min; denaturation at 95° C. for 15 s; annealing at 58° C. for 15 s; extension at 72° C. (an extension time is calculated according to 4 kb/min), 28 cycles; extension at 72° C. for 2 min; and storage at 4° C.

Recombination reaction system: 2×GenRec Assembly Master Mix: 10 μL, linearized vector: 0.03 μmol, target gene fragment: 0.09 μmol, and ddH$_2$O: making up to the total volume of 20 μL.

Recombination reaction conditions: A prepared reaction solution is placed in a 50° C. water bath to allow a reaction for 50 min.

Example 1 Construction of Engineered Bacteria EGT01

An ergothioneine-synthesizing gene cluster MnegtABCDE derived from *Mycolicibacterium neoaurum* (GenBank accession No: NZ_CP074376.1, location=1102768 . . . 1104015, 1104012 . . . 1105292, 1105285 . . . 1105971, 1105968 . . . 1106906, and 1106903 . . . 1107985) was subjected to codon optimization for *Escherichia coli* to produce an optimized sequence shown in SEQ ID NO: 1. A constitutive promoter PrrnD (a sequence of the PrrnD was shown in SEQ ID NO: 2) was added preceding the optimized sequence to produce a gene fragment, and the gene fragment was chemically synthesized. With the synthesized gene as a template, the primers egt-F and egt-R in Table 1 were used to conduct PCR amplification to produce a MnegtABCDE gene cluster fragment carrying the constitutive promoter PrrnD.

TABLE 1

| Primer name | SEQ ID NO: | Sequence (5'-3') |
|---|---|---|
| egt-F | SEQ ID NO: 3 | CGAAATCGCGGCAGACAGAAAAA AAGATCAAAAAAATACTTGTGC |
| egt-R | SEQ ID NO: 4 | CAGCGCCAGACTGTTTTAGCTAG ACACAGCTACC |

Primers motA-U-F/motA-U-R and motA-D-F/motA-D-R were designed according to a sequence of the motA gene (GenBank accession No: NZ_CP053602.1, location=1923468 . . . 1924355). With a genome of *Escherichia coli* BL21 (DE3) as a template, PCR amplification was conducted with the designed primers to produce gene fragments motA-U and motA-D, respectively. With the gene fragments motA-U, motA-D, and MnegtABCDE as templates and the motA-U-F and motA-D-R as primers, fusion PCR amplification was conducted to produce a MnegtABCDE gene cluster expression cassette. Sequences of the primers adopted in the above process were shown in Table 2.

TABLE 2

| Primer name | SEQ ID NO: | Sequence (5'-3') |
|---|---|---|
| motA-U-F | SEQ ID NO: 5 | GTGCTTATCTTATTAGGTTACC |
| motA-U-R | SEQ ID NO: 6 | TTTTTGATCTTTTTTTCTGTCT GCCGCGATTTCG |
| motA-D-F | SEQ ID NO: 7 | GGTAGCTGTGTCTAGCTAAAAC AGTCTGGCGCTG |
| motA-D-R | SEQ ID NO: 8 | TCATGCTTCCTCGGTTG |

Whole-plasmid PCR amplification was conducted with a pTarget plasmid as a template and sgmotA-F (sgRNA primer for the motA locus) and pTarget-R as primers. A resulting PCR product was enzymatically digested, purified, ligated, and chemically transformed into *Escherichia coli* JM109 competent cells. Transformed competent cells were coated on an LB solid medium plate including 30 mg/L of spectinomycin, and cultured at 37° C. to produce single colonies. Colony PCR verification was conducted with the primers testsg-motA-F and pTarget-R to select a correct strain, namely, a strain carrying a pTargetF-sgmotA plasmid targeting the motA gene. Sequences of the primers adopted in the above process were shown in Table 3.

TABLE 3

| Primer name | SEQ ID NO: | Sequence (5'-3') |
|---|---|---|
| sgmotA-F | SEQ ID NO: 9 | CAAGCATGACGCTATCCGCG GTTTTAGAGCTAGAAATAGC |
| pTarget-R | SEQ ID NO: 10 | ACTAGTATTATAGCTAGCAC TGAGC |
| testsg-motA-F | SEQ ID NO: 11 | CAAGCATGACGCTATCCGCG |

*Escherichia coli* BL21 (DE3) was activated on an LB solid medium plate, then inoculated into an LB liquid medium, and cultured overnight to produce a seed culture. The seed culture was transferred to 25 mL of an LB liquid medium at 1%, cultured at 30° C. and 200 rpm until $OD_{600}$ was 0.5, and then incubated in an ice bath for 30 min. A resulting bacterial solution was centrifuged at 4° C. and 4,000 rpm for 10 min to collect bacteria. The bacteria were washed three times with a pre-cooled 10% glycerol solution, then resuspended with 300 μL of a 10% glycerol solution, and dispensed in sterile 1.5 mL EP tubes with 80 L/tube to obtain *Escherichia coli* BL21 (DE3) electrocompetent cells.

A plasmid pCas carrying a transporter gene was electrotransformed into the *Escherichia coli* BL21 (DE3) electrocompetent cells. Transformed competent cells were coated on an LB solid medium plate including 30 mg/L of kanamycin and cultured at 37° C. to produce single colonies BL21 (DE3)/pCas. Electrocompetent cells were prepared with the *Escherichia coli* BL21 (DE3)/pCas. The MnegtABCDE gene cluster expression cassette and the pTargetF-sgmotA plasmid were simultaneously electrotransformed into the electrocompetent cells. Transformed competent cells were coated on an LB solid medium plate including 30 mg/L of kanamycin and spectinomycin, and cultured at 30° C. to produce single colonies. Colony PCR verification and sequencing verification were conducted with the primers motA-U-F and motA-D-R in Table 2. A correct strain was *Escherichia coli* BL21 (DE3) ΔmotA:: MnegtABCDE/pCas/pTargetF-sgmotA.

The *Escherichia coli* BL21 (DE3) ΔmotA:: MnegtABCDE/pCas/pTargetF-sgmotA was inoculated into a kanamycin-containing LB liquid medium, IPTG was added at a final concentration of 0.5 mM, and the *Escherichia coli* was cultured at 30° C. and 200 rpm under shaking for 2 h. A resulting bacterial solution was coated on an LB solid medium plate including 30 mg/L of kanamycin, and cultured at 30° C. Single colonies without spectinomycin resistance were selected to obtain *Escherichia coli* BL21 (DE3) ΔmotA: MnegtABCDE/pCas with the pTargetF-sgmotA plasmid removed.

The *Escherichia coli* BL21 (DE3) ΔmotA:: MnegtABCDE/pCas was inoculated into an antibiotic-free LB liquid medium and cultured at 42° C. and 200 rpm under shaking for 2 h. A resulting bacterial solution was coated on an antibiotic-free LB solid medium plate and cultured at 42° C. Single colonies without kanamycin resistance were selected to obtain *Escherichia coli* BL21 (DE3) ΔmotA:: MnegtABCDE with the pCas plasmid removed, which were the engineered bacteria EGT01.

Example 2 Construction of Engineered Bacteria EGT02

Primers hisG-F/hisG-R were designed according to a sequence of the hisG gene (GenBank accession No: NZ_CP053602.1, location=1987293 . . . 1988192). With a genome of *Escherichia coli* BL21 (DE3) as a template, PCR amplification was conducted with the designed primers to produce a gene fragment hisG. PCR amplification was conducted with a vector pET-24a(+) as a template and pET-F and pET-R as primers to produce a linearized vector pET-24a(+). Sequences of the primers adopted in the above process were shown in Table 4.

TABLE 4

| Primer name | SEQ ID NO: | Sequence (5'-3') |
|---|---|---|
| hisG-F | SEQ ID NO: 12 | CTTTAAGAAGGAGATATACATA TGACAGACAACTCTCGTTTAC |
| hisG-R | SEQ ID NO: 13 | CTCAGCTTCCTTTCGGGCTTTG TCACTCCATCATCTTCTCAATC |

TABLE 4-continued

| Primer name | SEQ ID NO: | Sequence (5'-3') |
|---|---|---|
| pET-F | SEQ ID NO: 14 | CAAAGCCCGAAAGGAAGCTGAG |
| pET-R | SEQ ID NO: 15 | ATGTATATCTCCTTCTTAAAG |

A hisG gene was ligated to the linearized vector pET-24a (+) through a recombination reaction, and sequencing verification was conducted to produce a recombinant vector pET-24a(+)-hisG. Whole-plasmid PCR was conducted with the primers hisGE271K-F and hisGE271K-R in Table 5 to produce a recombinant vector pET-24a(+)-hisG$^{E271K}$. The template plasmid was digested and then transformed into *Escherichia coli*, and a resulting plasmid was extracted and sequenced for verification. With the recombinant vector pET-24a(+)-hisG$^{E271K}$ as a template, PCR amplification was conducted using the primers hisG-F/hisG-R in Table 4 to produce a gene fragment hisG$^{E271K}$.

TABLE 5

| Primer name | SEQ ID NO: | Sequence (5'-3') |
|---|---|---|
| hisGE271K-F | SEQ ID NO: 16 | GGTCAGTAGCAAAACCCTGTTCTG |
| hisGE271K-R | SEQ ID NO: 17 | GGTTTTGCTACTGACCATGTGC |

Whole-plasmid PCR amplification was conducted with a pTarget plasmid as a template and sghisG-F (sgRNA primer for the hisG locus) and the pTarget-R in Table 3 as primers. A resulting PCR product was enzymatically digested, purified, ligated, and chemically transformed into *Escherichia coli* JM109 competent cells. Transformed competent cells were coated on an LB solid medium plate including 30 mg/L of spectinomycin, and cultured at 37° C. to produce single colonies. Colony PCR verification was conducted with the primers testsg-hisG-F and the pTarget-R in Table 3 to select a correct strain, namely, a strain carrying a pTargetF-sghisG plasmid targeting the hisG gene. Sequences of the primers adopted in the above process were shown in Table 6.

TABLE 6

| Primer name | SEQ ID NO: | Sequence (5'-3') |
|---|---|---|
| sghisG-F | SEQ ID NO: 18 | TGAGTCATCACTTAAACGGC GTTTTAGAGCTAGAAATAGC |
| testsg-hisG-F | SEQ ID NO: 19 | TGAGTCATCACTTAAACGGC |

Engineered bacteria EGT01/pCas electrocompetent cells were prepared according to the method in Example 1. The hisG$^{E271K}$ gene fragment and the pTargetF-sghisG plasmid were electrotransformed simultaneously into the competent cells.

Transformed competent cells were coated on an LB solid medium plate including 30 mg/L of kanamycin and spectinomycin, and cultured at 30° C. to produce single colonies. Colony PCR verification and sequencing verification were conducted with the primers hisG-F and hisG-R. A correct strain was *Escherichia coli* EGT01-hisG$^{E271K}$/pCas/pTargetF-sghisG.

The *Escherichia coli* EGT01-hisG$^{E271K}$/pCas/pTargetF-sghisG was inoculated into a kanamycin-containing LB liquid medium, IPTG was added at a final concentration of 0.5 mM, and the *Escherichia coli* was cultured at 30° C. and 200 rpm under shaking for 2 h. A resulting bacterial solution was coated on an LB solid medium plate including 30 mg/L of kanamycin, and cultured at 30° C. Single colonies without spectinomycin resistance were selected to obtain *Escherichia coli* EGT01-hisG$^{E271K}$/pCas with the pTargetF-sghisG plasmid removed.

The *Escherichia coli* EGT01-hisG$^{E271K}$/pCas was inoculated into an antibiotic-free LB liquid medium and cultured at 42° C. and 200 rpm under shaking for 2 h. A resulting bacterial solution was coated on an antibiotic-free LB solid medium plate and cultured at 42° C. Single colonies without kanamycin resistance were selected to obtain *Escherichia coli* EGT01-hisG$^{E271K}$ with the pCas plasmid removed, which were the engineered bacteria EGT02.

Examples 3 to 5 and Comparative Examples 1 to 3 were fermentation tests of related strains. Medium formulas involved in these examples were as follows:

LB liquid medium: yeast extract: 5 g/L, tryptone: 10 g/L, and sodium chloride: 10 g/L.

LB solid medium: yeast extract: 5 g/L, tryptone: 10 g/L, sodium chloride: 10 g/L, and agar: 15 g/L.

Seed medium for ergothioneine: glucose: 20 g/L to 25 g/L, yeast extract: 4 g/L to 6 g/L, peptone: 2 g/L to 4 g/L, dipotassium phosphate: 6 g/L to 8 g/L, magnesium sulfate heptahydrate: 1 g/L to 2 g/L, ferrous sulfate heptahydrate: 40 mg/L to 60 mg/L, manganese sulfate monohydrate: 10 mg/L to 20 mg/L, and vitamin B1: 2 mg/L to 5 mg/L.

Fermentation medium for ergothioneine: glucose: 20 g/L to 25 g/L, yeast extract: 1 g/L to 5 g/L, ammonium sulfate: 5 g/L to 7 g/L, dipotassium phosphate: 8 g/L to 10 g/L, citric acid monohydrate: 2 g/L to 4 g/L, magnesium sulfate heptahydrate: 1 g/L to 2 g/L, ferrous sulfate heptahydrate: 150 mg/L to 200 mg/L, manganese sulfate monohydrate: 10 mg/L to 20 mg/L, vitamin B1: 2 mg/L to 5 mg/L, methionine: 2 g/L to 4 g/L, and trace elements: 1 mL/L to 2 mL/L. The trace elements were as follows: sodium molybdate dihydrate: 2.5 g/L, nickel sulfate hexahydrate: 2.5 g/L, calcium chloride dihydrate: 2 g/L, copper sulfate pentahydrate: 0.75 g/L, aluminum sulfate octahydrate: 2.25 g/L, cobalt chloride hexahydrate: 2.5 g/L, zinc chloride: 0.5 g/L, and boric acid: 3 g/L.

First supplemented medium for ergothioneine: glucose: 600 g/L to 800 g/L and yeast extract: 8 g/L to 10 g/L.

Second supplemented medium for ergothioneine: methionine: 10 g/L to 15 g/L and cysteine: 6 g/L to 8 g/L.

The materials used for the preparation of media all were commercially-available analytically-pure reagents.

The high-performance liquid chromatography (HPLC) analysis for ergothioneine in each example and comparative example of the present disclosure was conducted as follows:

(1) Instrument: Shimadzu LC-2050 high-performance liquid chromatograph.

(2) Chromatographic column: Thermo Fisher Scientific Hypersil ODS-2, 250×4.6 mm, and 5 µm.

(3) Method parameters: a mobile phase: 5% (v/v) methanol aqueous solution; a flow rate: 1 mL/min; a wavelength of an ultraviolet detector: 257 nm; a column temperature: 35° C.; an injection volume: 5 µL; and a detection time: 15 min.

(4) Standard curve establishment method: 0.0500 g of an ergothioneine standard sample (commercially-available 99% ergothioneine) was accurately weighed, dissolved with ultrapure water, and diluted to 50 mL to produce a 1 g/L standard sample stock solution. 1 mL, 2 mL, 3 mL, 4 mL, and 5 mL of the stock solution each were taken and diluted with ultrapure water to 10 mL to produce standard sample solutions with concentrations of 0.1 g/L, 0.2 g/L, 0.3 g/L, 0.4 g/L, and 0.5 g/L, respectively. The standard sample solutions each were filtered with a 0.22 µm water phase needle filter membrane and tested by HPLC. A standard curve was plotted with a concentration as an x-coordinate and a peak area as a y-coordinate, and an equation of the standard curve was calculated.

(5) Detection of ergothioneine contents in finished products: 0.01 g (accurate to 0.00001 g) of an ergothioneine reference was accurately weighed, placed in a 50 mL volumetric flask, dissolved with ultrapure water, diluted to a specified scale, thoroughly shaken, and filtered with a 0.22 µm filter membrane to produce a reference solution. 0.01 g (accurate to 0.00001 g) of an ergothioneine sample was accurately weighed, placed in a 50 mL volumetric flask, dissolved with ultrapure water, diluted to a specified scale, thoroughly shaken, and filtered with a 0.22 µm filter membrane to produce a sample solution. Two sample solutions were prepared in parallel. The reference solution and the sample solutions each were injected according to the chromatographic conditions, and chromatograms were recorded. A content of ergothioneine in a sample was calculated by an external standard single-point method:

$$\text{content of ergothioneine in a sample} = (As \times mr \times Pr)/(Ar \times ms) \times 100\%$$

where As represents a peak area of ergothioneine in a sample solution, Ar represents a peak area of ergothioneine in the reference solution, ms represents a weight of an ergothioneine sample (g), mr represents a weight of the ergothioneine reference (g), and Pr represents a content of the ergothioneine reference. An arithmetic mean value of results of two parallel measurements was taken as a reported value. An absolute difference between the results of two parallel measurements was not greater than 2% of the arithmetic mean value.

Example 3 Fermentation of the Engineered Bacteria EGT02 in a Shake Flask

The engineered bacteria EGT02 were streaked on an LB solid medium plate for activation and cultured at 37° C. for 12 h, and inoculated into 10 mL of a seed medium and cultured at 37° C. and 220 rpm under shaking for 12 h to produce a seed culture. The seed culture was inoculated into 50 mL of a fermentation medium at an inoculum size of 5%, and cultured at 37° C. and 220 rpm under shaking for 48 h. A titer of ergothioneine in a fermentation broth was determined by HPLC to be 0.74 g/L.

Comparative Example 1 Fermentation of the Engineered Bacteria EGT01 in a Shake Flask A shake-flask fermentation experiment was conducted with the engineered bacteria EGT01 according to the conditions in Example 3. A titer of ergothioneine in a fermentation broth produced after 48 h of fermentation was determined by HPLC to be 0.19 g/L.

Example 4 Fermentation of the Engineered Bacteria EGT02 in a 5 L Tank

The engineered bacteria EGT02 were streaked on an LB solid medium plate for activation and cultured at 37° C. for 12 h, and inoculated into 10 mL of a seed medium and cultured at 37° C. and 220 rpm under shaking for 12 h to produce a primary seed culture. The primary seed culture was inoculated into 100 mL of a seed medium at an inoculum size of 2%, and cultured at 37° C. and 220 rpm under shaking for 5 h to produce a secondary seed culture. The secondary seed culture was inoculated into 2 L of a fermentation medium at an inoculum size of 8%, and cultured. During the culture, a temperature was 37° C., an initial rotational speed was 250 rpm, a ventilation rate was 2 L/min (1 vvm), and a pH was controlled at 7.0±0.05 with 25% to 28% ammonia water. After the inoculation, a dissolved oxygen was controlled at 30% through dissolved oxygen-stirring connected control. A sample was collected every 2 h and tested for $OD_{600}$ and glucose. When a glucose concentration in an initial medium was lower than 1 g/L, the feeding of the first supplemented medium was started to maintain a glucose concentration in a fermentation broth at 1 g/L to 2 g/L. When an $OD_{600}$ value reached 10, the feeding of the second supplemented medium was started at a flow rate of 20 mL/h. Fermentation was completed at 48 h. A titer of ergothioneine in a fermentation broth was determined by HPLC to be 6.22 g/L.

Comparative Example 2 Fermentation of the Engineered Bacteria EGT01 in a 5 L Tank A 5 L tank fermentation experiment was conducted with the engineered bacteria EGT01 according to the conditions in Example 4. A titer of ergothioneine in a fermentation broth produced after 48 h of fermentation was determined by HPLC to be 2.49 g/L.

Example 5 Fermentation of the Engineered Bacteria EGT02 in a 50 L Tank

The engineered bacteria EGT02 were streaked on an LB solid medium plate for activation and cultured at 37° C. for 12 h, and inoculated into 10 mL of a seed medium and cultured at 37° C. and 220 rpm under shaking for 12 h to produce a primary seed culture. The primary seed culture was inoculated into 400 mL of a seed medium at an inoculum size of 2%, and cultured at 37° C. and 220 rpm under shaking for 5 h to produce a secondary seed culture. The secondary seed culture was inoculated into 20 L of a fermentation medium at an inoculum size of 8%, and cultured. During the culture, a temperature was 37° C., an initial rotational speed was 200 rpm, a ventilation rate was 1.2 m³/h (1 vvm), and a pH was controlled at 7.0±0.05 with 25% to 28% ammonia water. After the inoculation, a dissolved oxygen was controlled at 30% through dissolved oxygen-stirring connected control. A sample was collected every 2 h and tested for $OD_{600}$ and glucose. When a glucose concentration in an initial medium was lower than 1 g/L, the feeding of the first supplemented medium was started to maintain a glucose concentration in a fermentation broth at 1 g/L to 2 g/L. When an $OD_{600}$ value reached 10, the feeding of the second supplemented medium was started at a flow rate of 200 mL/h. Fermentation was completed at 48 h. A titer of ergothioneine in a fermentation broth was determined by HPLC to be 6.80 g/L.

Comparative Example 3 Fermentation of the Engineered Bacteria EGT01 in a 50 L Tank A 50 L tank fermentation experiment was conducted with the engineered bacteria EGT01 according to the conditions in Example 5. A titer of ergothioneine in a fermentation broth produced after 48 h of fermentation was determined by HPLC to be 2.91 g/L.

Example 6 Separation and Purification of Ergothioneine in a Fermentation Broth

Figure 3:
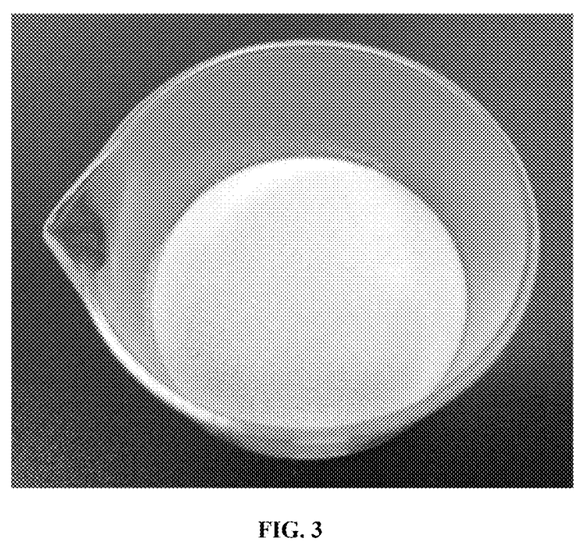
FIG. 3 shows a finished product of ergothioneine in an embodiment.

The ergothioneine-containing fermentation broth produced in Example 5 was filtered through a 50 nm ceramic membrane with a pressure controlled at 0.45 MPa to 0.55 MPa and a temperature controlled at lower than 40° C., and pure water was added for replacement until a yield was 98.2%. The ceramic membrane filtration could remove cells and insoluble solids in the fermentation broth to produce a clear liquid. The clear liquid produced by the ceramic membrane was ultra-filtered through a 5,000 D ultrafiltration membrane with a pressure controlled at 0.45 MPa to 0.55 MPa and a temperature controlled at lower than 40° C., and pure water was added for replacement until a yield was 98.5%. The ultrafiltration membrane filtration could remove macromolecular proteins and sugars to produce a clear liquid. The clear liquid produced by the ultrafiltration membrane was decolorized with an LX-98 decolorization resin, and pure water was added for replacement until a yield was 99.3%. A decolorized liquid and a replaced liquid each were collected. The decolorized liquid and the replaced liquid each were vacuum-concentrated at a temperature of 65° C. until an ergothioneine content was 202 g/L. Absolute ethanol was added in a volume 5 times a volume of a concentrate to the concentrate, and stirring was conducted at room temperature to allow crystallization for 16 h. A resulting crystallization mixture was subjected to suction filtration to produce a wet crystal. The wet crystal was washed with absolute ethanol 3 times, and then dried at 65° C. for 12 h to produce a finished product of ergothioneine (FIG. 3). A content of ergothioneine in the finished product was determined by HPLC to be 99.55%.

The above embodiments merely represent several implementations of the present disclosure, and the descriptions thereof are specific and detailed, but should not be construed as limiting the patent scope of the present disclosure. It should be noted that those of ordinary skills in the art can further make several variations and modifications without departing from the inventive concept of the present disclosure, and such variations and modifications all fall within the claimed scope of the present disclosure.

What is claimed is:

1. A construction method of ergothioneine-producing engineered bacteria, comprising:
   1) integrating a constitutive promoter PrrnD and an ergothioneine-synthesizing gene cluster MnegtABCDE derived from *Mycolicibacterium neoaurum* into a genome of *Escherichia coli* BL21 (DE3) as a starting strain,
   wherein the step 1) is as follows: subjecting the ergothioneine-synthesizing gene cluster MnegtABCDE derived from the *Mycolicibacterium neoaurum* to codon optimization for the *Escherichia coli* BL21 (DE3) to produce an optimized sequence, adding the constitutive promoter PrrnD preceding the optimized sequence to produce a MnegtABCDE gene cluster fragment carrying the constitutive promoter PrrnD, and integrating the MnegtABCDE gene cluster fragment to a motA locus in a genome of *Escherichia coli* BL21 (DE3), wherein a sgRNA primer for the motA locus is set forth in SEQ ID NO: 9;
   the optimized sequence produced after the codon optimization for the *Escherichia coli* is set forth in SEQ ID NO: 1, and the sequence of the constitutive promoter PrrnD is set forth in SEQ ID NO: 2; and
   2) mutating glutamate at a position 271 in an ATP phosphoribosyltransferase HisG gene of a strain produced in the step 1) into lysine to produce the ergothioneine-producing engineered bacteria,
   wherein the step 2) is as follows:
   2-1) with the genome of the *Escherichia coli* BL21 (DE3) as a template, conducting polymerase chain reaction (PCR) amplification to produce a hisG gene, wherein primers adopted for the PCR amplification are a primer hisG-F shown in SEQ ID NO: 12 and a primer hisG-R shown in SEQ ID NO: 13;
   2-2) ligating the hisG gene to a linearized vector pET-24a(+) through a recombination reaction to produce a recombinant vector pET-24a(+)-hisG; and conducting whole-plasmid PCR with a primer hisGE271K-F shown in SEQ ID NO: 16 and a primer hisGE271K-R shown in SEQ ID NO: 17 to produce a recombinant vector pET-24a(+)-hisG$^{E271K}$;
   2-3) with the recombinant vector pET-24a(+)-hisG$^{E271K}$ as a template, conducting PCR amplification to produce a hisG$^{E271K}$ gene fragment;
   2-4) with a pTarget plasmid as a template, constructing a pTargetF-sghisG plasmid targeting the hisG gene;
   2-5) electrotransforming a pCas plasmid carrying a transporter gene into the strain obtained in the step 1) to produce an engineered bacteria EGT01/pCas, then further preparing to produce an engineered bacteria EGT01/pCas electrocompetent cell, and electrotransforming the hisG$^{E271K}$ gene fragment and the pTargetF-sghisG plasmid simultaneously into the engineered bacteria EGT01/pCas electrocompetent cell to produce *Escherichia coli* EGT01-hisG$^{E271K}$/pCas/pTargetF-sghisG; and
   2-6) subjecting the *Escherichia coli* EGT01-hisG$^{E271K}$/pCas/pTargetF-sghisG to a screening culture to produce *Escherichia coli* EGT01-hisG$^{E271K}$ with the pTargetF-sghisG plasmid and the pCas plasmid removed, wherein the *Escherichia coli* EGT01-hisG$^{E271K}$ is the ergothioneine-producing engineered bacteria.

* * * * *

SEQUENCE LISTING

```
Sequence total quantity: 19
SEQ ID NO: 1             moltype = DNA  length = 5308
FEATURE                  Location/Qualifiers
source                   1..5308
                         mol_type = other DNA
                         organism = synthetic construct
SEQUENCE: 1
aaggagatat acatatgagc gctaccacta cctgggatgt tgattgtccg tccggtcaaa   60
ccgctgcggc aatcgccgct tcttgcctgc acgatggccc ggttggtacc gttggtctgg  120
aagtcgaagc gcattgcttc gacctgaccg atccgatgcg tcgtcctggc tgggaagaac  180
tgtccgttct gatcgcggcc gctccggcgc tgccgggtgg ttctgctatt accgttgaac  240
cgggtggtgc cgtggaactg tccggccctc cgtgtgtaga cgttgtcagc gcgatcagcg  300
gtctgaccgc agatcgccgt gtgctgaaca cgtacttcgc ggaacacggt ctgggtctgg  360
tactgctggg tactgacccg ctgcgcccga cgcagcgtgt taacccgggt gcgcgttacc  420
aggccatgga gcagttttc gcggcgaccg gtgcaggtgc agctggtgca gctatgatga  480
cttctaccgc gtccatgcag ctgaacgtgg aagctggccc acgtgccggc tgggctgacc  540
gtgtccgtct ggctcatgca ctgggcccga cgatgattgc tctgtccgct aacagcccgc  600
tgctgaacgg tgaattcacc ggttggcgtt ccacccgtca gcgtgtttgg ggtcagctgg  660
attctgcccg ttgcggtccg gtgctgggtg atcgcggtga cgaccctgcc gcagactggg  720
cgaactatgc gctgcgtgca ccggtaatgc tggttcgtac tccggaagcc gtaccgatga  780
cggaatttgt ttccttcgcg gactgggctg acggccacgt ggttctgggt ggccgttctc  840
cgaccaccga ggatctggcg taccacctga ccacgctgtt tccacctgtc cgtccgcgcc  900
gttggctgga aatccgttac ctggattccg tccctgatgc tgtttggccg gcggttgcgt  960
ttaccctggc aaccctgctg gacaaccgg acgctgctga aatcgctcgc gaagcgactg 1020
agtccgtttc ttctgcgtgg gaccgtgccg cgcgtttcgg tctggccgat ccgcaactgc 1080
atatcgctgc ccgtcgttgt gtggaagctg ctgcggaata cgcgccggcc gagctggctg 1140
ttccgatgca ccgtctgctg atgaacgttc atgaaggccg ctccctgct gacgatttct 1200
ccgaccgtgt tcagctgcgc ggtctggcga gcgcgatcac cgaacgtgtc ggtgatgaat 1260
aaaaggagat atacatatga gcaccccctga cctgctggct gctgaactga cccgcgcgcg 1320
tgatcgcacc ctggcgctgg ttgacttcga cgacgcagag ctgctgcgtc agtacgaccc 1380
gctgatgagc ccgctggttt gggacctggc tcacattggt cagcaggagg aattctggct 1440
gctgcgtggt ggcaatagcg cagctccggg tatgctggct ccggatgttg aaaaactgta 1500
cgatgcattc gttcacagcc gtgcttcccg cgtagatctg ccactgctgc caccaaccga 1560
tgctcgtgcc tactgtcgtg atgttcgtaa ccgcgtgctg gacacccgtg agcatagcac 1620
ggaactgttc ccgttcggcc tggtgatctc ccacgaaaac cagcacgatg aaaccatgct 1680
gcaggcgctg aacctgcgct ccggtccgcc gatcctgccg gctggctctc cactgcctgt 1740
gggtcgtggc ggtgttgtag gcacctctgt gctgatccct ggtggtccgt ttaccctggg 1800
cgttgatgcg tccgctgaac cttactccct ggacaatgaa cgtccggccc acactgttga 1860
agtagacgct ttccgcattg gtcgtgttcc ggttacgaac gcggaatggc gtgtcttcat 1920
ggccgatggc ggttatcgta cccgtcagtg gtggtctgac gcgggttggg cacaccgcac 1980
tcaggctgcg ctggtggctc ctggcttctg gaacgacgac ggttctcgca cgcgcttcgg 2040
ttaccgtgaa gatatcccgg gcgacgaacc ggtacaacac atcacgtact acgaggctga 2100
ggcgtatgct gcatgggcgg gcgcacgtct gccgaccgaa atcgaatggg aaaaagcatg 2160
cgcttgggat cctaccgcgg gcatgcgccg tcgttatcca tggggcgcag cagaaccgga 2220
tgctgagcgc gcgaacctgg gtggtcgttc tctgcgtcca gcgccggtgg gtgcataccc 2280
ggctgcgcg tctgcttacg gcgttgaaca gatgctgggt gacgtctggg aatggacctg 2340
cagcccgctg cgtccgtggc cgggtttcag cccgatgatc tatgatcgtt actctgtgcc 2400
gttcttcgaa actgcaactt ccaccggcga ttaccgtgtt ctgcgcggcg gcgcctggtc 2460
tgttgcgggc gatatcctgc gcccgtcctt ccgcaactgg gaccacccga ttcgccgcca 2520
aatcttctct ggtctgcgcc tggcctggga tgtgtaaaag gagatataca tatgtgccgt 2580
cacctgggct ggctgggcgc tcctgtttcc gcagcatccg tcgtgctgga cccaccttct 2640
```

```
ggtctgctgg ttcagtctta cgcgccgcgt cgccagaaac acggcaccat caacgccgac  2700
ggttggggcg ttggtttctt cgatgaaggt ccgcgccgct ggcgttctga caaaccgctg  2760
tggggtgacg catcctttgc gtccgttgcg ccgaccctgc gttccggttg tatcgttgcc  2820
gcagtgcgca gcgcaaccgt aggcatgccg atcgagccga gcgcgtctgc accgtttacc  2880
gatggcagct ggctgctgtc tcacaacggc gtggtcgatc gcgaggttct gccggcaact  2940
cgtgacgccg aaagctctgt tgacagcgct gttctggcag cacatatctt tcagcgcggc  3000
atggctgtcc tgggtgagac catcgcagaa atcggtgcac gcgatccggg cgcccgtctg  3060
aacattctgg caggtgacgg tagccgtctg ctggctacta cctggggtga taccctgttc  3120
gcactggaac gcgcggatgg tacggttctg gcttccgagc cgtacgacga cgctgattgg  3180
ctggatatcc cagaccgtca tctggtggag gtatccgcca cgggtctgat gctgacccca  3240
ctggaaggtc cgcgttaaaa ggagatatac atatgactac ccatctggaa aactctctgc  3300
gccgtgatgt agccgaaggc ctgcgtcgta acccgaaaag cctgcctccg aagtggttct  3360
acgattccgt cggttccgac ctgttcgacc agatcacccg tctgccggag tattacccga  3420
ctcgcactga agccaaaatc ctgggtgagc acgcggccga catcgcggaa gtatccgctg  3480
ccgatacgct ggtagaactg ggtagccgta cttccgaaaa aactcgcctg ctgctggatg  3540
cgttccgtgc ccgtggtgtt ctgcgtcgct tcatcccgtt cgatgtagac ccgagcgttc  3600
tgggtgcagc agcaaccgct ctgcacactg aatatccgga cctggagatc gacactgttt  3660
gcggtgactt cgaacaagac ctgccaacca ttccgaagat cggtcgtcgt atggtggtgt  3720
ttctgggttc taccatcggt aatctgaccg ctggtccgcg tgcagatttc ctggcagcgg  3780
tcgctgacac catgcagact ggtgattccc tgctgctggg taccgacctg gtgaaagatg  3840
ttgatcgcct ggttcgtgcg tacgacgatg cggccggtgt tactgcagct ttcaaccgta  3900
acgttctggc agtcgtgaac cgcgaactgg gtgctgactt tgacccatct gctttcgctc  3960
acgtggcaaa atgaacgat actgaagaac gcatcgaaat gtggctgcgt tccacgctgt  4020
ctcagcgtgt gcacgtgcgt gacctggacc tgaccgttga ctttgaggct ggcgaagaaa  4080
tgctgaccga agtgtcttgc aagttccgcc cggctgtat tgctgatgaa ctggctgcag  4140
ccggtctgac ccgtacgcac tggtggaccg atccggctgg tactttgc gtatcctgg  4200
cagtaaaata aaaggagata tacatatgag cctggcagaa cagtggcgtg ctgctcgcgt  4260
cccggtagct ggcgtccacc tggactctgc ggcgtgctcc cgtcagtcca atgccgtcat  4320
cgaagtagcg gctgcgcacg cgcgtcacga agctgaagta ggcggttacg tggcgggtga  4380
ggctgcagca ccggccctgg acgcgggtcg tgccgcagta cgccgcactgg cgggcatgac  4440
ggaagcggaa gtggtcttca cgactggttc taaccacgcg ctggatctgc tgctgagctc  4500
ttggcagggt ccacgtactg cagcttgcct gcacggtgag tatggtccga acctgaccat  4560
catggcggct aacgcgttcg aagttcgcct gctgccggtc gacgaaagcg gtcgtctgcg  4620
tattgacgcc gcggctggtg ttctgcgtgc agacccgcct gctctggtac acctgacggt  4680
gctgggtcc caccgcggca ttgttcagcc gctggccgaa ctggcgcagg tatgccgtga  4740
tctgggtctg ccgctggttg tagatgctgc gcaaggtctg ggccacgtgg attgcgcggt  4800
tggtgcggac gtactgtata cctcctcccg caaatggctg gctggcccac gtggcgttgg  4860
tgccctggca gtacgtccgg aactgtacgc tcagctggtg ccgcgttggg caccgatgga  4920
gctgcatgaa gccaacattg gctcccgtct gggctttcc ctggccctgg gcgaatatct  4980
ggcagctggc ccggctgata ctcaggctcg cctggctgaa atcggtgcgc tgacgcgtgg  5040
tgtgctggct gacatcgtgg gttggcaggt tgttgaaccg gcagcggaac cgagcgcaat  5100
caccaccctg cgcccgctgc agggcgccga accggcggta gttcgtgcgc gtctgatcgc  5160
ggagcacgag attatcacca ccgcctgtga agtaggccgc agcccgcatg aaatggatgg  5220
cccggtgctg cgtgtgagcc cgcacgtgga tggcagcgcg cagacctgg agcgctttgc  5280
tgcggctctg gtagctgtgt ctagctaa                                    5308

SEQ ID NO: 2        moltype = DNA   length = 96
FEATURE             Location/Qualifiers
source              1..96
                    mol_type = other DNA
                    organism = synthetic construct
SEQUENCE: 2
cagaaaaaaa gatcaaaaaa atacttgtgc aaaaaattgg gatccctata atgcgcctcc  60
gttgagacga ataacaattt cacacaggaa acagct                             96

SEQ ID NO: 3        moltype = DNA   length = 45
FEATURE             Location/Qualifiers
source              1..45
                    mol_type = other DNA
                    organism = synthetic construct
SEQUENCE: 3
cgaaatcgcg gcagacagaa aaaagatca aaaaatact tgtgc                     45

SEQ ID NO: 4        moltype = DNA   length = 34
FEATURE             Location/Qualifiers
source              1..34
                    mol_type = other DNA
                    organism = synthetic construct
SEQUENCE: 4
cagcgccaga ctgttttagc tagacacagc tacc                               34

SEQ ID NO: 5        moltype = DNA   length = 22
FEATURE             Location/Qualifiers
source              1..22
                    mol_type = other DNA
                    organism = synthetic construct
SEQUENCE: 5
gtgcttatct tattaggtta cc                                            22
```

-continued

```
SEQ ID NO: 6            moltype = DNA  length = 34
FEATURE                 Location/Qualifiers
source                  1..34
                        mol_type = other DNA
                        organism = synthetic construct
SEQUENCE: 6
tttttgatct tttttctgt ctgccgcgat ttcg                                    34

SEQ ID NO: 7            moltype = DNA  length = 34
FEATURE                 Location/Qualifiers
source                  1..34
                        mol_type = other DNA
                        organism = synthetic construct
SEQUENCE: 7
ggtagctgtg tctagctaaa acagtctggc gctg                                   34

SEQ ID NO: 8            moltype = DNA  length = 17
FEATURE                 Location/Qualifiers
source                  1..17
                        mol_type = other DNA
                        organism = synthetic construct
SEQUENCE: 8
tcatgcttcc tcggttg                                                      17

SEQ ID NO: 9            moltype = DNA  length = 40
FEATURE                 Location/Qualifiers
source                  1..40
                        mol_type = other DNA
                        organism = synthetic construct
SEQUENCE: 9
caagcatgac gctatccgcg gttttagagc tagaaatagc                             40

SEQ ID NO: 10           moltype = DNA  length = 25
FEATURE                 Location/Qualifiers
source                  1..25
                        mol_type = other DNA
                        organism = synthetic construct
SEQUENCE: 10
actagtatta tagctagcac tgagc                                             25

SEQ ID NO: 11           moltype = DNA  length = 20
FEATURE                 Location/Qualifiers
source                  1..20
                        mol_type = other DNA
                        organism = synthetic construct
SEQUENCE: 11
caagcatgac gctatccgcg                                                   20

SEQ ID NO: 12           moltype = DNA  length = 43
FEATURE                 Location/Qualifiers
source                  1..43
                        mol_type = other DNA
                        organism = synthetic construct
SEQUENCE: 12
ctttaagaag gagatataca tatgacagac aactctcgtt tac                         43

SEQ ID NO: 13           moltype = DNA  length = 44
FEATURE                 Location/Qualifiers
source                  1..44
                        mol_type = other DNA
                        organism = synthetic construct
SEQUENCE: 13
ctcagcttcc tttcgggctt tgtcactcca tcatcttctc aatc                        44

SEQ ID NO: 14           moltype = DNA  length = 22
FEATURE                 Location/Qualifiers
source                  1..22
                        mol_type = other DNA
                        organism = synthetic construct
SEQUENCE: 14
caaagcccga aggaagctg ag                                                 22

SEQ ID NO: 15           moltype = DNA  length = 21
FEATURE                 Location/Qualifiers
source                  1..21
                        mol_type = other DNA
                        organism = synthetic construct
SEQUENCE: 15
atgtatatct ccttcttaaa g                                                 21
```

```
SEQ ID NO: 16          moltype = DNA  length = 24
FEATURE                Location/Qualifiers
source                 1..24
                       mol_type = other DNA
                       organism = synthetic construct
SEQUENCE: 16
ggtcagtagc aaaaccctgt tctg                                          24

SEQ ID NO: 17          moltype = DNA  length = 22
FEATURE                Location/Qualifiers
source                 1..22
                       mol_type = other DNA
                       organism = synthetic construct
SEQUENCE: 17
ggttttgcta ctgaccatgt gc                                            22

SEQ ID NO: 18          moltype = DNA  length = 40
FEATURE                Location/Qualifiers
source                 1..40
                       mol_type = other DNA
                       organism = synthetic construct
SEQUENCE: 18
tgagtcatca cttaaacggc gttttagagc tagaaatagc                         40

SEQ ID NO: 19          moltype = DNA  length = 20
FEATURE                Location/Qualifiers
source                 1..20
                       mol_type = other DNA
                       organism = synthetic construct
SEQUENCE: 19
tgagtcatca cttaaacggc                                               20
```